Figure 1:
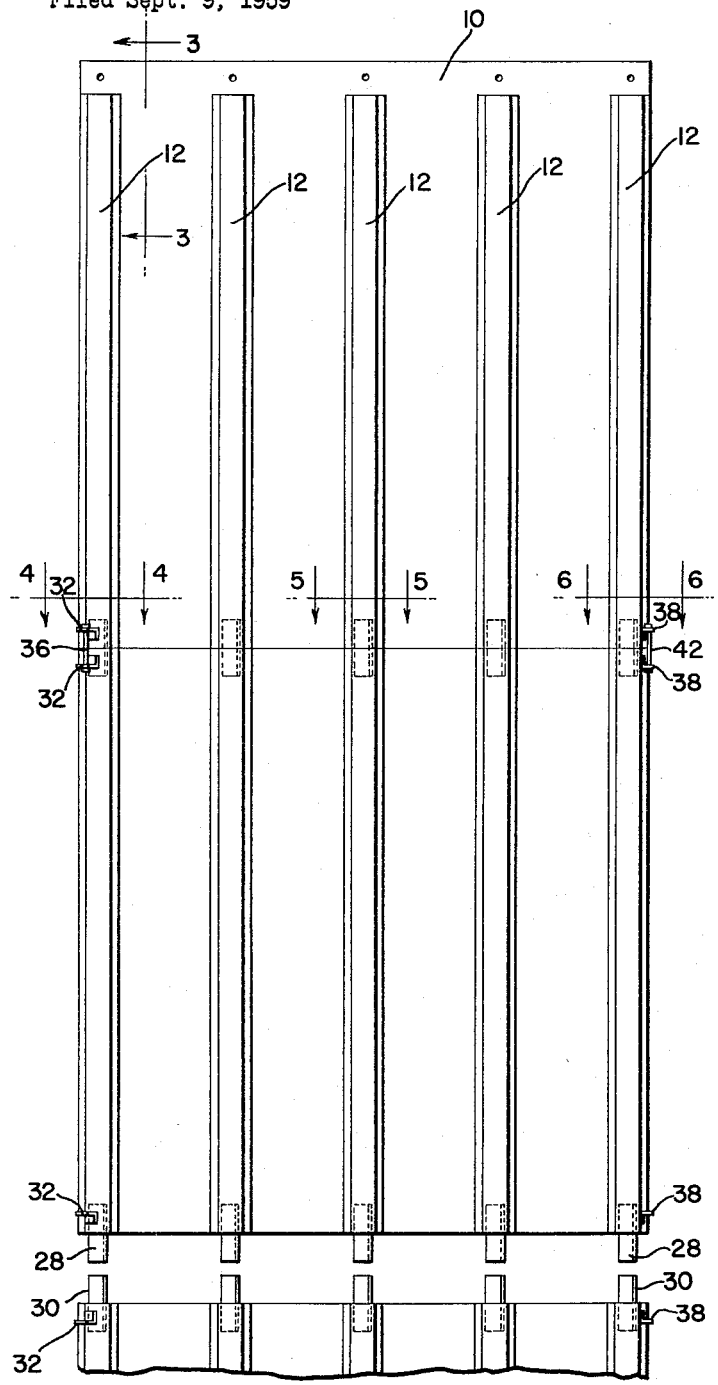

Aug. 15, 1961

J. PHYL 2,996,144

COLLECTING ELECTRODE

Filed Sept. 9, 1959

2 Sheets-Sheet 1

INVENTORS
JOSEPH PHYL

BY Harold T. Stowell
Harold L. Stowell

ATTORNEYS

Aug. 15, 1961   J. PHYL   2,996,144
COLLECTING ELECTRODE
Filed Sept. 9, 1959   2 Sheets-Sheet 2
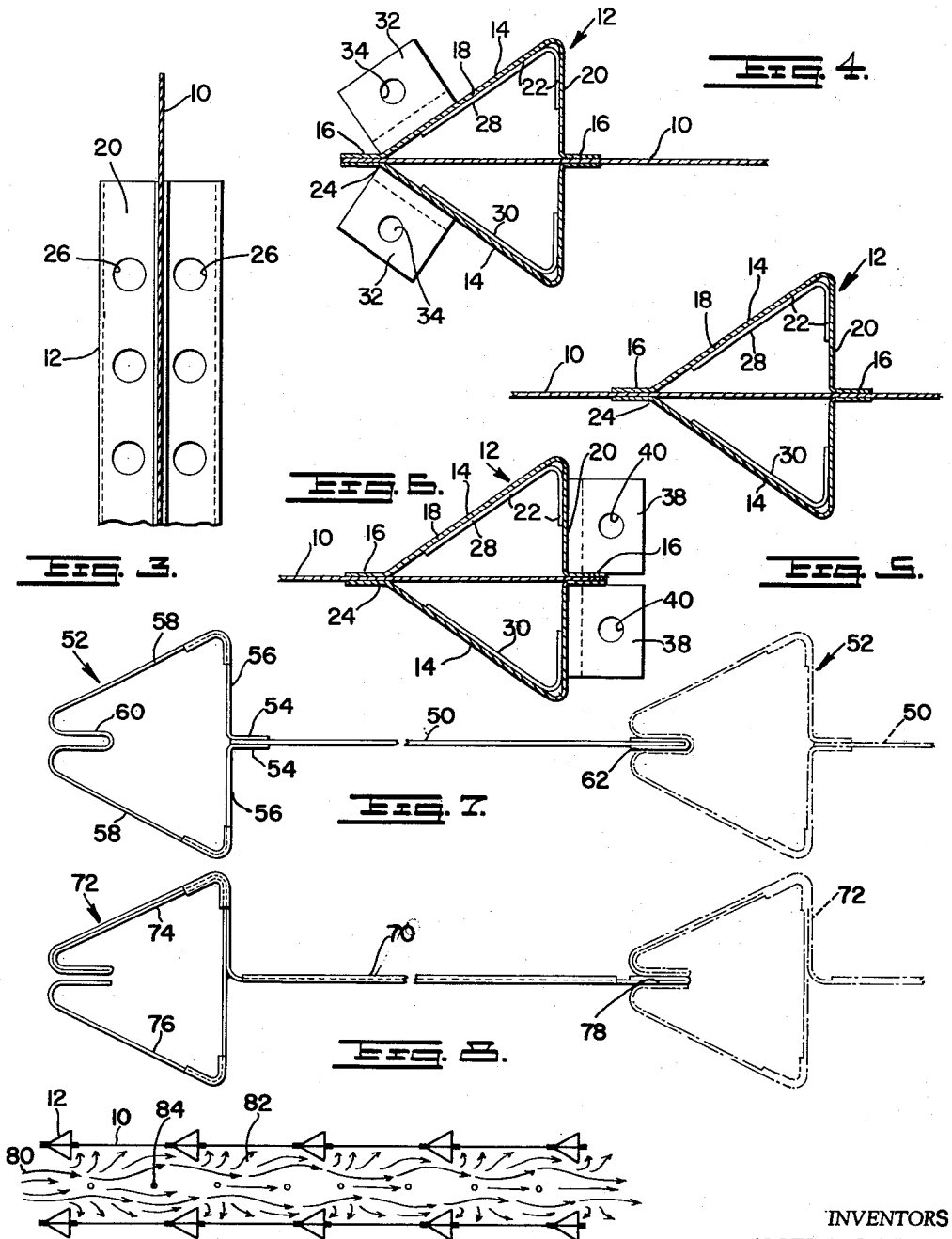
INVENTORS
JOSEPH PHYL
BY Harold T. Stowell
Harold L. Stowell
ATTORNEYS

2,996,144
COLLECTING ELECTRODE
Joseph Phyl, Fanwood, N.J., assignor to Research-Cottrell, Inc., Bridgewater Township, N.J., a corporation of New Jersey
Filed Sept. 9, 1959, Ser. No. 838,955
3 Claims. (Cl. 183—7)

The present invention relates to collecting plates for electrical precipitators and, more particularly and specifically to a new and improved collecting plate having a unique gas flow baffle structure and arrangement which serves to produce new and useful results in the electrical precipitation art.

It has long been recognized that the performance efficiency of electrostatic precipitators is directly dependent to a substantial degree on the construction and characteristics of the collecting plates utilized in the precipitators.

Electrical and gas flow properties are essentially the most important factors in providing the effective and satisfactory collecting plate constructions necessary to the maximum efficiency of the precipitators.

For example, collecting plate characteristics of sparking voltage and reaction to high resistivity dusts are of primary importance in providing or effecting the most satisfactory plate performance; while gas flow characteristics lending themselves to prevention of particle corrosion and high collection efficiency are also of utmost importance.

A general object of the present invention is to produce a collecting plate construction for electrical precipitators, together with a method of assembling or constructing same which provides a plate having the necessary basic and fundamental factors for maximum efficiency in operation.

Another object of the invention resides in the provision of a collecting plate construction for use in electrical precipitators which enables the maintenance of stagnant gas zones in close adjacency to the plate surfaces whereby a portion of the dust concentrating in this area due to mechanical flow action and electrical winds induced by the corona discharge wires will be collected and removed from the associated duct.

A still further object of the invention is the provision of an electrical precipitator collecting plate in which the new and improved baffle structures enable the use of lighter plate assemblies with maximum characteristics of plate stiffness and rigidity inherent in the combined assembly of the plate with the gas flow baffles which form plate stiffening structures.

The nature of the present invention may be stated in general terms as consisting of a new and improved collecting plate for electrical precipitators including flat rigid plates of substantially rectangular configuration, and a plurality of baffles secured longitudinally of the plate in one direction in spaced parallel relationship therealong, said baffles including a pair of complementary members secured on opposite sides of the plate and presenting angular projections with the plate in one direction therealong, said angular projections turning at their projected ends to extend perpendicularly to the plate forming right angular projections in the opposite direction along the length of the plate, said perpendicularly extending portion being provided with a plurality of dust receiving apertures.

Figure 2:
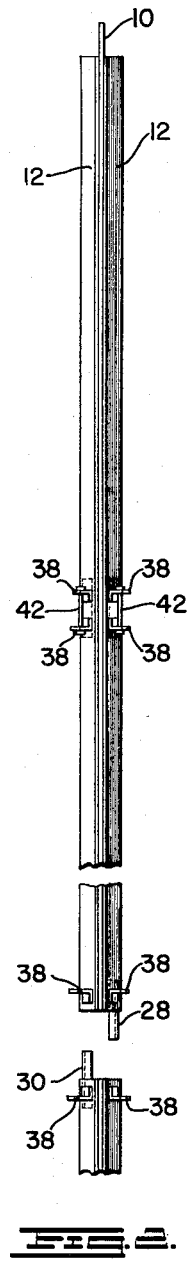

Referring now to the accompanying drawings in which like reference numerals indicate similar parts throughout the several views:

FIGURE 1 is an elevational view of a collecting plate constructed in accordance with the present invention, FIGURE 2 is an end view of the plate illustrated in FIGURE 1, FIGURE 3 is a sectional view taken along line 3—3 of FIGURE 1 showing the dust receiving apertures formed in the baffles, FIGURE 4 is a sectional view of a baffle taken along line 4—4 of FIGURE 1, FIGURE 5 is a sectional view taken along line 5—5 of FIGURE 1, FIGURE 6 is a sectional view taken along line 6—6 of FIGURE 1, FIGURE 7 is an enlarged fragmentary view of a modified form of the baffle of the collecting electrode structure, FIGURE 8 is an enlarged fragmentary view similar to FIGURE 7 showing a still further modified version of the structure, and FIGURE 9 is a diagrammatic plan view illustrating gas flow along two spaced collecting plates constructed in accordance with the present invention.

While the accompanying drawings and the following description illustrate a collecting plate formed of flat, solid sheet plate materials, it is fully contemplated and anticipated that perforated, dimpled or corrugated sheet material could be used without departing from the spirit of the present invention and there are to be no limitations implied herein beyond the requirement of the claims hereinafter appended and the prior art.

Referring to FIGURES 1 and 2 of the drawings, there is illustrated a flat, substantially rectangular sheet or plate 10 which forms the basic collecting electrode or collecting plate within an electrical precipitator construction. The plate 10 is provided at equally spaced intervals along the lateral length thereof with hollow baffles 12 which extend vertically of the plate in parallel relationship.

As is clearly illustrated in FIGURES 4, 5, and 6 of the drawings, each of the baffles 12 includes a pair of elongate channel members 14 having a pair of oppositely projecting spaced, aligned flange members 16 which are interconnected by two straight sections 18 and 20 forming a rounded, acute angle 22 to the plane of the aligned flanges with the section 20 extending perpendicularly to the plane of the flanges and section 18 lying at an angle relative thereto. The two identical cross members 14 forming the baffle members 12 are positioned in opposition to one another on opposite sides of the plate 10 to form in cross-sectional configuration a substantially equilateral triangle with corresponding flanges 16 of each of the members being secured to the opposite faces of the plate 10.

All of the baffles on each of the plates 10 within the precipitator are secured to the plates with their apex portions 24 extending in the same direction along the length of the plate 10 and thereby forming in a direction opposite thereto a series of V-shaped projections extending on either side of the plate with the projections being closed by the perpendicular portion 20 of the baffle members on the sides thereof away from the apices of the baffles.

As is clearly illustrated in FIGURE 3, the perpendicular portions of the baffle members 12 are provided with a plurality of apertures or openings 26. These apertures 26 function to trap the dust concentrating in this area due to mechanical flow action and partially driven into this area by electrical winds induced by the corona of the discharge electrode wires and will thereby remove a portion of the concentrated dust from the duct through the interior portion of the channels formed by the baffle members 12. In a typical arrangement wherein the sections 20 were 20 feet in length, the apertures were 1½ inch in diameter and spaced apart on 3 inch centers.

It will be noted from FIGURES 1 and 2 that a composite collecting electrode structure for an electrical precipitator is formed of a plurality of plates 10 and their associated baffle members 12 disposed in superposed relationship. In order to provide a positive and snug fit between two superposed plates 10, a pair of cooperating extensions 28 and 30 are employed. The extension 28 is suitably secured, such as by welding, brazing or the like, to the inner surface of the bottom of the baffle 12 disposed at the rear of the plate 10; while the extension 30 is similarly secured to the inner surface of the top of the baffle 12 disposed in front of the plate 10 immediately below the aforementioned plate 10. To facilitate the assembling of the individual plate and baffle units into a composite collecting plate assembly, the exposed remote ends of the extensions 28 and 30 may be curved slightly inwardly.

As clearly illustrated in FIGURE 4, the upstream baffle members 12 have wing-like portions 32 struck outwardly from the channel members 14 and are provided with fastener receiving openings 34. A threaded fastener 36 may be used to positively secure the two mating panels 10 in their assembled position.

The downstream baffle members 12 have wing-like portions 38, illustrated in FIGURE 6, struck outwardly from the perpendicular portion 20 and are provided with fastener receiving openings 40. In a similar manner to the wing-like portions 32, a threaded fastener 42 may be used to positively secure the two mating panels 10 into a composite collecting electrode.

Now referring to FIGURES 7 and 8 which show modification of my invention wherein the composite collecting electrode structure is comprised of a plurality of vertically extending plate sections.

In FIGURE 7 the composite collecting plate electrode assembly is formed of a plurality of vertically extending plate sections 50. Both the upstream and the downstream edges of the plate sections 50 are secured to baffle members 52. The baffle members 52 differ from the baffle members 12 illustrated and described in connection with FIGURES 1 through 6 primarily in the feature of being of one-piece construction. The baffle members 52 include a pair of parallel spaced apart flanges 54, a pair of perpendicular oppositely extending portions 56, a pair of inwardly extending portions 58 which meet in an inwardly formed U-shaped section 60. The upstream edge of the plate section 50 is adapted to be received and suitably secured between the spaced apart flanges 54. The downstream edges of the plate sections 50 are provided with edging 62 which is typically spot-welded thereto. The edging 62 and the associated edge of its plate section 50 is adapted to be received in the U-shaped section 60 of the baffle members 52. In assembling the plates 50 and the baffle members 52 into a composite collecting electrode assembly, the mating portions of the plates 50 and the baffle members 52 are typically spot-welded at six-inch intervals. Manifestly, in the modification illustrated in FIGURE 7, there are dust receiving openings or apertures formed in the perpendicular oppositely extending portions 56 and function in a manner identical with the dust-receiving apertures or openings 26 of the embodiment illustrated in FIGURES 1 through 6.

The modification of my invention illustrated in FIGURE 8 shows a collecting electrode plate structure wherein the plate section 70 and its associated baffle member 72 are formed of a single piece of sheet metal. A generally triangular baffle structure is formed by initially forming one-half of the baffle member 72 as indicated at 74 which is folded upon itself to extend laterally perpendicular to the plate section 70 whereupon the second half of the baffle is formed as indicated at 76.

The opposite marginal edge of the plate section 70 is folded back upon itself as shown at 78 and is adapted to be received in an appropriate slot in the apex of the triangular baffle member 72. In a typical collecting plate electrode assembly, the mating surfaces of the folded edge portion 78 and the associated adjacent baffle member 72 are spot-welded at twelve-inch intervals.

Referring now to FIGURE 9 of the drawings, wherein there is shown a gas flow diagram for a precipitator in which are incorporated the collecting plates 10 made in accordance with the present invention, it may be seen that the gas entering the zone between the spaced parallel collecting plates 10 as indicated by arrows 80, will flow along the opposed surfaces of the plates in the general flow pattern indicated by the arrows 82 creating stagnant gas flow zones immediately adjacent the plate surfaces wherein the dust concentrating in this area due to mechanical flow action and partially driven into this area by electrical winds induced by the corona of the discharge wires 84 whereupon the trapped dust will enter and pass through the apertures in the rear surfaces of the baffle members 12, thus removing a substantial portion of the dust from the duct.

In a typical operation, assuming a gas velocity at 6 feet per second through a 9-inch duct, the treating time for a plate 6 feet in length and including five baffles per plate will equal 0.76 second and for a similar plate comprised of four baffles per plate will equal 0.775 second.

From the foregoing description, it will be seen that new improved collecting plate construction incorporating a unique baffle structure has been provided which, when assembled within an electrical precipitator within the specification ranges set forth will produce substantial new and improved results in precipitator operation rendering the precipitator more efficient and effective than prior constructions.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an electrical precipitator having a plurality of spaced parallel discharge electrodes arranged in a row, and collecting plate electrodes extending in parallel spaced relationship to the row of discharge electrodes, the combination with the collecting electrode plate of a plurality of baffles extending in parallel spaced relationship from the plate electrode transversely of the direction of gas flow, each of said baffles comprising a base portion extending normally to the extended surface of the collecting plate and to the direction of gas flow, and a leg portion sloping inwardly and upstream from the extended edge of the base portion to the collecting plate, said base portions being provided with a plurality of spaced apertures for receiving dust concentrated in proximity thereto.

2. In an electrical precipitator having a plurality of spaced parallel discharge electrodes arranged in a row, and collecting plate electrodes extending in parallel spaced relationship to the row of discharge electrodes, the combination with the collecting electrode plate of a plurality of baffles extending in parallel spaced relationship from the plate electrode transversely of the direction of gas flow, each of said baffles comprising a base portion extending normally to the extended surface of the collecting plate and to the direction of gas flow and disposed on opposite sides of the collecting plate electrode, and a leg portion sloping inwardly and upstream from the extended edge of the base portion to the collecting plate, said base portions being provided with a plurality of spaced apertures for receiving dust concentrated in proximity thereto.

3. In an electrical precipitator as claimed in claim 2 wherein said baffles and their associated collecting plate electrodes are arranged in parallel spaced relation with respect to one another and said baffles on one collecting plate electrode are in direct opposition with said of an associated collecting plate electrode.

References Cited in the file of this patent

UNITED STATES PATENTS 2,815,824    Armstrong et al.    Dec. 10, 1957

FOREIGN PATENTS 487,866    Germany    Dec. 31, 1929
549,644    Germany    Apr. 29, 1932
953,218    France    May 16, 1959